United States Patent [19]

Mimura et al.

[11] Patent Number: 4,674,835
[45] Date of Patent: Jun. 23, 1987

[54] FLUORIDE GLASS OPTICAL FIBER

[75] Inventors: Yoshinori Mimura; Hideharu Tokiwa, both of Saitama; Osamu Shinbori, Tokyo; Tetsuya Nakai, Kanagawa, all of Japan

[73] Assignee: Kokusai Denshin Denwa Co., Ltd., Tokyo, Japan

[21] Appl. No.: 765,477

[22] Filed: Aug. 14, 1985

[30] Foreign Application Priority Data

Sep. 4, 1984 [JP] Japan ............... 59-183754

[51] Int. Cl.⁴ .................................. G02B 6/00
[52] U.S. Cl. .................... 350/96.34; 428/373
[58] Field of Search .......... 501/37, 38; 350/96.30, 350/96.34, 96.23; 428/373

[56] References Cited

U.S. PATENT DOCUMENTS 4,445,755  5/1984  Ohsawa et al. ............... 501/37

FOREIGN PATENT DOCUMENTS 57-166335 10/1982 Japan ................... 501/37

OTHER PUBLICATIONS

"A Core-Clad Composition for Crystallization-Free Fluoride Fibers", Journal of Lightwave Technology, vol. LT-3, No. 3, Jun. 1985, pp. 569-573.

Primary Examiner—Lorraine T. Kendell
Attorney, Agent, or Firm—Armstrong, Nikaido, Marmelstein & Kubovcik

[57] ABSTRACT

In a fluoride glass optical fiber with extremely small transmission loss for infrared light having a core layer and a clad layer each consisting mainly of $ZrF_4$ - $BaF_2$ - $LaF_3$ - $AlF_3$, NaF and $H_fF_4$ are used as additives to obtain a desired refractive index difference between the core layer and the clad layer. The mixing ratio of the NaF to the $H_fF_4$ satisfies the realtions;

$$|0.25 \Delta H_fF_4 - 3\Delta NaF| \leq 5.$$

where $\Delta NaF$ is the difference between the amount (mol %) of the $N_aF$ to be added to the core layer and that to be added to the clad layer, and $\Delta H_fF_4$ to be added to the core layer and that to be added to the clad layer.

2 Claims, 5 Drawing Figures

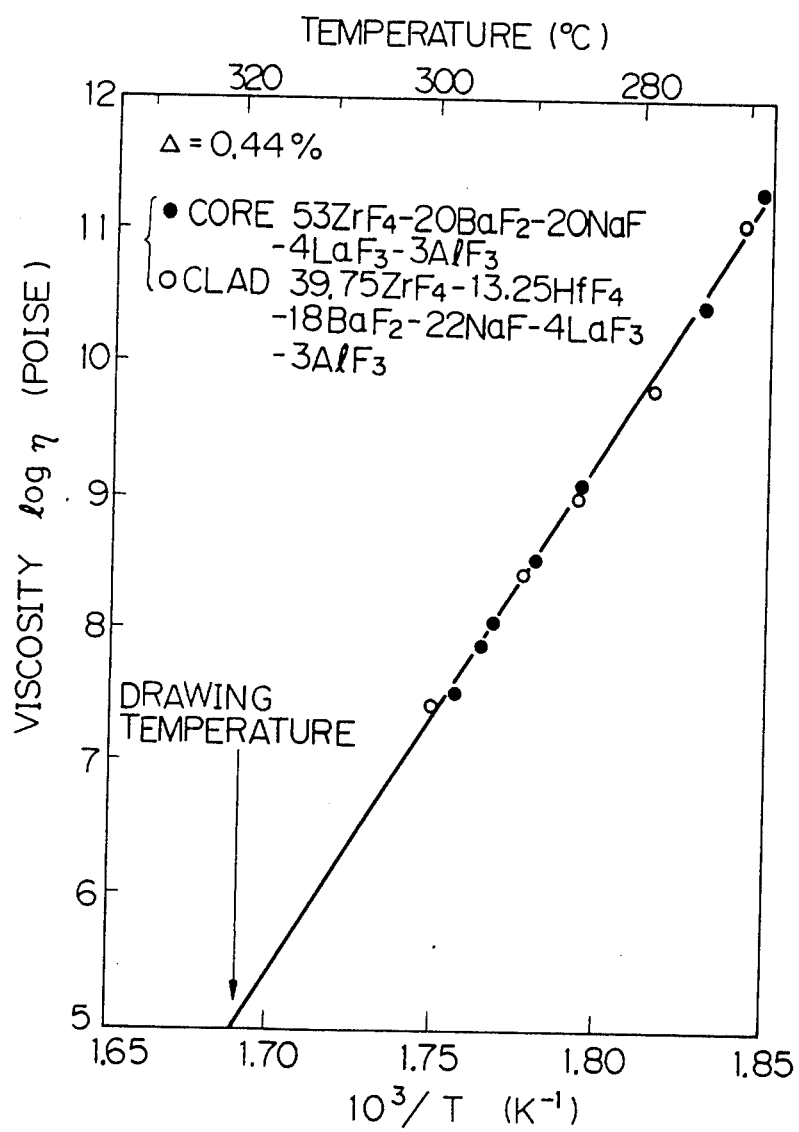

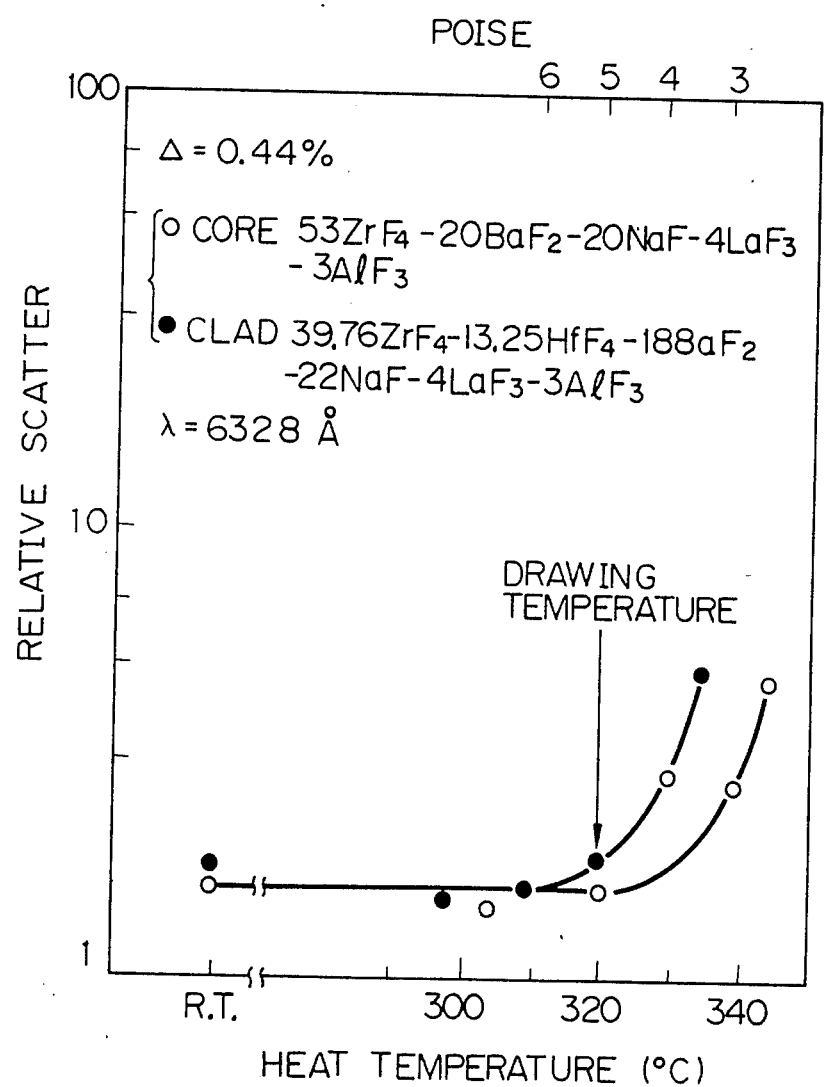

FLUORIDE GLASS OPTICAL FIBER

BACKGROUND OF THE INVENTION

The present invention relates to a fluoride glass optical fiber adopted to effectively transmit light of a wavelength of 2–4 μm.

In the mid-infrared region, it is comparatively easy to obtain a stabilized large output light by use of a gas laser like $CO_2$ laser, but no medium capable of transmitting the obtained output light with a low loss has yet to be realized. Accordingly, the use of infrared radiation is limited to a few fields such as a surgical scalpel in the medical field, and metal and wooden chip processing field.

It is predicted that some chemical compounds like fluoride, chloride, bromide and iodide allow infrared radiation of 2–4 μm wave length to be transmitted with an extremely small loss of 0.001 dB/km.

Therefore, if an optical fiber like a silica fiber which removes external loss factors completely and displays only its intrinsic loss could be provided, it would then be possible to realize a direct communication system for distances up to 10,000 km in the communication field.

To increase the utilization efficiency of infrared radiation and to enable it to be used in various fields, it is necessary to conceive an optical fiber which allows infrared radiation to pass therethrough with low loss. From this standpoint, several kinds of primitive infrared fibers have been provided and of these fibers, one that has shown a minimum loss consists mainly of fluoride glass but even in this case, the value of the loss is as great as 5–6 dB/km in a 2 μm wavelength range which is far greater than the theoretical value.

The following two factors are considered causes for the inability to achieve a reduction in loss in the fluoride glass optical fiber.

One is the absorption loss due to the existence of water or transition metal ions in the fluoride glass as impurities and the other is the increase in the scattering loss due to the generation of fine crystals in the glass when a preform of the glass is drawn into a fiber by heating.

As described above, in order to make the transmission loss of the fluoride glass fiber approach its theoretical value as close as possible, it is absolutely necessary to reduce both of the above-mentioned adsorption and scattering losses.

The absorption loss is not peculiar to the fluoride glass optical fiber but is common with other optical fibers and it is necessary to avoid it by high purification of the fiber material or the dehydration of glass material as in the case of the silica glass optical fiber.

However, the scattering loss due to the precipitation of fine crystals of the material is not observed in the silica glass optical fiber but is an essential problem resulting from the properties of the fluoride glass itself. To describe the essential conditions required of a glass material for forming an optical fiber, the optical fiber is produced from a block of the material called a preform, by drawing. To draw the glass material, it is heated to a viscosity suitable for drawing. This viscosity is usually $10^5$ poise and the temperature at this stage is called a drawing temperature which varies depending on the composition of glass used. Accordingly, to obtain a drawn fiber without generating fine crystals in the glass, it is necessary for the crystallization temperature to be higher than the drawing temperature.

Further, in order for the optical fiber to have a suitable waveguide structure, it is necessary to have a core layer and a clad layer between which a certain refractive index difference exists. This refractive index difference is obtained by varying the composition of the glass material used. Further, the two layers must be drawn simultaneously.

To sum up, the essential conditions required of a glass for an optical fiber are that the glass must include two kinds of composition having refractive indexes different from each other by the required amount, and the crystallization temperatures of both glasses must be higher than the drawing temperature of either glass, whichever the higher.

However, a core-clad composition has not been found that satisfies the above-mentioned conditions.

For example, in the case of the conventional fluoride glass optical fiber belonging to the $ZrF_4$-$BaF_2$-$LiF$-$LaF_3$-$AlF_3$ type or the $ZrF_4$$BaF_2$-$NaF$-$LaF_3$-$AlF_3$ type, the glass forming the core layer has been added with $PbF_2$ so as to increase the refractive index of the core layer to be higher than that of the clad layer so that the drawing temperature of the core glass becomes lower than the drawing temperature of the clad. As a result, when the material is drawn into the optical fiber, fine crystals are generated in the core layer causing a high transmission loss.

SUMMARY OF THE INVENTION

The object of the present invention is to provide a fluoride glass fiber with which no increase takes place in the scattering loss due to the precipitation of fine crystals of the glass at the time of drawing.

The feature of the present invention resides in the use of NaF and $H_fF_4$ as additives for the purpose of obtaining the specific refractive index difference between the core layer and the clad layer and of adjusting the viscosities and the linear expansion coefficients of the core layer and the clad layer.

By adding NaF and $H_fF_4$, it is possible to prevent the crystallization of the glass in the drawing process and prevent an increase in the scattering loss, thereby obtaining an optical fiber with a small transmission loss.

BRIEF DESCRIPTION OF THE DRAWINGS

The foregoing and other objects, features, and attendant advantages of the present invention will be appreciated as the same become better understood by means of the following description and accompanying drawings wherein;

FIG. 4 is a graph showing temperatures at viscosities of glasses forming a core layer and a clad layer of an optical fiber.

FIG. 5 is a graph showing, as functions of heating temperature, the degrees of scattering of the glasses.

DESCRIPTION OF THE PREFERRED EMBODIMENTS

It is considered that the reason for the generation of fine crystals in the glass at the time of drawing a preform into a fluoride glass fiber is that the glass structure which has been stabilized at room temperature becomes unstable as it is heated to a high temperature and fine crystals precipitates.

To obtain a glass fiber that does not produce a scattering loss due to the precipitation of fine crystals of the glass at the time of drawing, it is necessary to discover a glass composition in which the scattering property of the glass does not change even if the glass is heated to a temperature at which a viscosity of $\eta = 10^5$ poise results.

Figure 1:
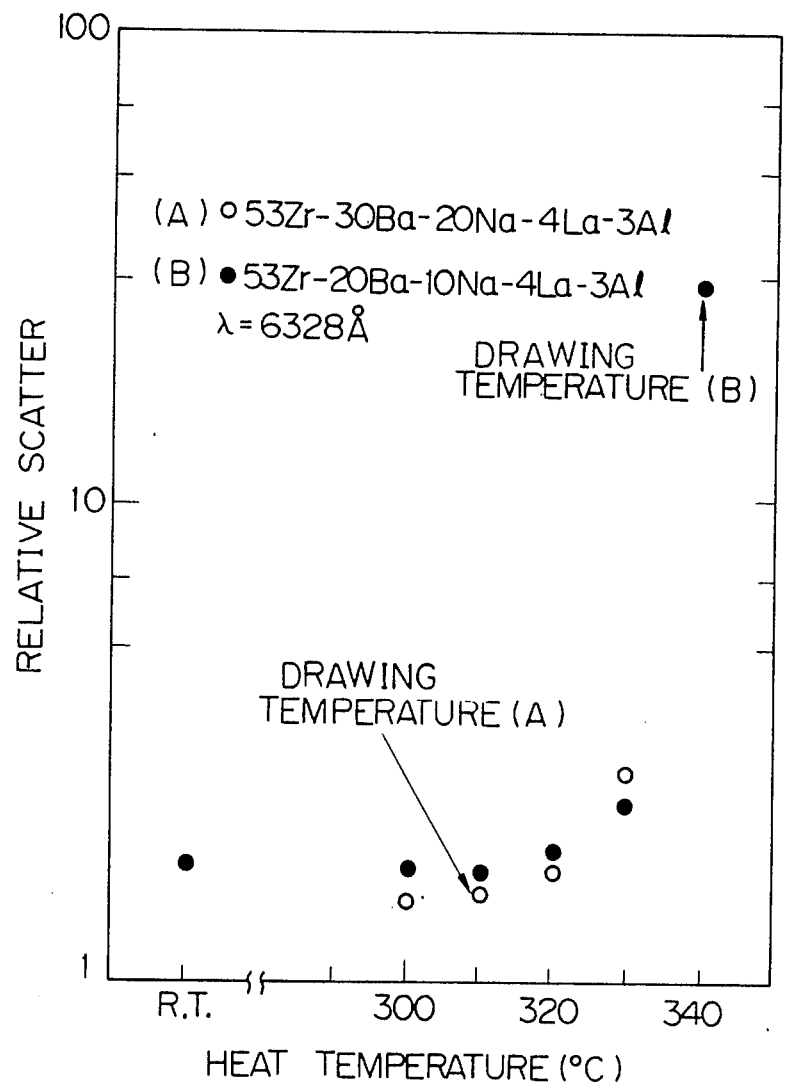
FIG. 1 is a graph showing examples of a glass (A) which shows almost no increase, and a glass (B) which shows a remarkable increase, in scattering due to crystallization when the glasses are heated to a drawing temperature. In the graph, the relative scattering degrees of the glasses (where the scattering degree of quartz glass is 1) are shown along the Y-axis and heating temperature values are shown along the X-axis.

From this point of view, fluoride glasses having various different compositions have been examined and as a result, it has been found that a glass having a composition in the range of (all in mol%) $50 \leq ZrF_4 \leq 55$, $16 \leq BaF_2 \leq 24$, $16 \leq NaF \leq 24$, $3 \leq LaF_3 \leq 5$, $2 \leq AlF_3 \leq 4$ (provided that $ZrF_4 + BaF_2 + NaF + LaF_3 + AlF_3 = 100$) shows no increase in scattering even when it is heated to the $\eta = 10^5$ poise temperature. FIG. 1 shows an example in which the scattering degrees of glasses having such compositions as (A) $53ZrF_4$-$20BaF_2$-$20NaF$-$4LaF_3$-$3AlF_3$, and (B) $53ZrF_4$-$30BaF_2$-$10NaF$-$4LaF_3$-$3AlF_3$ are measured as functions of the heating temperature. In FIG. 1, the figures shown along the Y-axis designate the relative scattering degrees of the glasses measured when the scattering degree of the quartz type glass is 1. It is understood from FIG. 1 that the glass (A) which falls within the above-mentioned composition range shows an extremely small increase in scattering even at a temperature of 32° C. at which a viscosity of $\eta = 10^5$ is obtained while the glass (B) which is outside the range shows a rapid increase at a temperature of 340° C. at which the viscosity of $= 10^5$ is obtained. From the above results only, $\eta$ it is considered that by the use of a glass material having a composition falling within the above composition range, the manufacture of an optical fiber without giving rise to great increase in scattering at the time of drawing is possible but it has been found that there are some important problems. That is, the optical fiber must have a core layer and a clad layer which have different refractive indexes, respectively, whereas it has been found difficult to obtain such glass fiber structure by mere use of the above-mentioned glass. Of the components of each glass material falling within the above-mentioned composition range, the only one that can produce the required refractive index difference between the core layer and the clad layer is NaF and therefore, it will be preferable if both of the layers could be formed by varying the NaF contents in the layers. However, this method has the following drawbacks.

Figure 2:
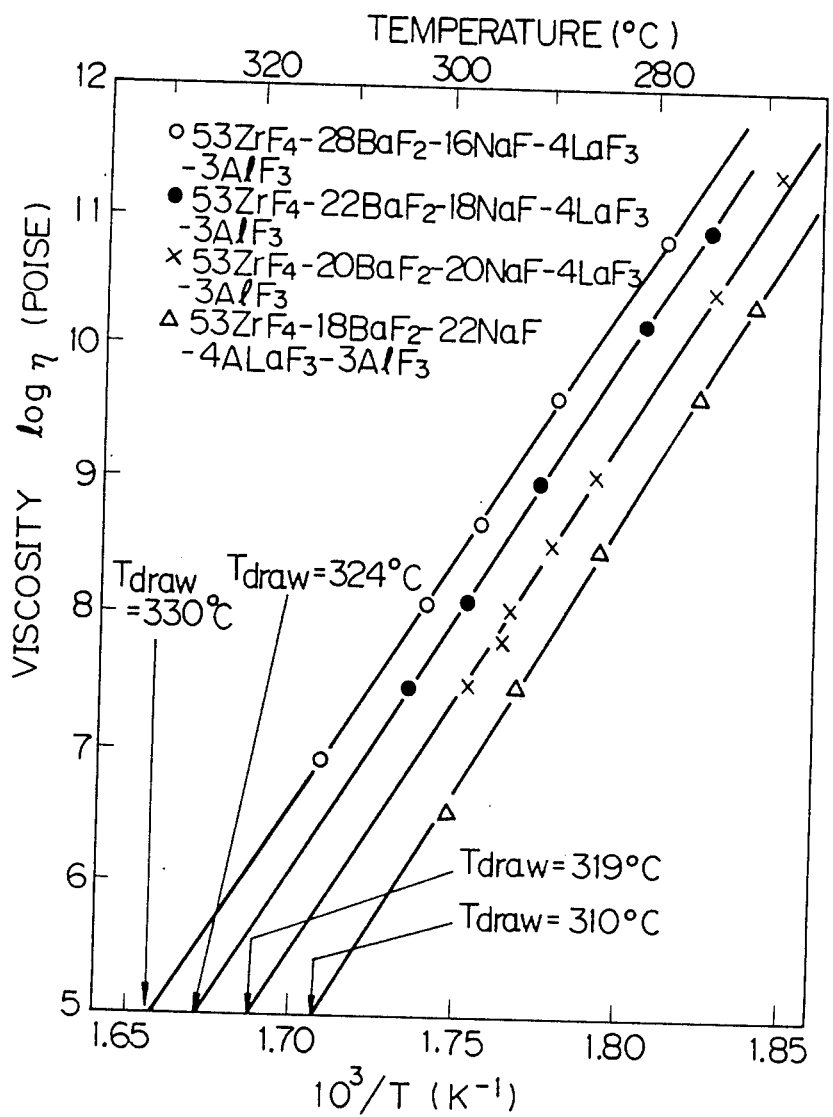
FIG. 2 is a graph showing temperature variations at viscosities of four kinds of $ZrF_4$-$BaF_2$-$NaF$-$LaF_3$-$AlF_3$ type glasses having different NaF contents.

FIG. 2 is a graph showing viscosities of glass belonging to the $ZrF_4$-$BaF_2$-$NaF$-$LaF_3$-$AlF_3$ type at various temperatures when the amount of NaF in each glass is changed. It will be understood from this graph that the viscosity of each glass varies greatly depending on its NaF content. Accordingly, assuming that a glass containing 16% of NaF is used to form a core layer and a glass material containing 22% of NaF is used to form a clad layer, the specific refractive index difference between the layers will be $\Delta = 0.45\%$. However, the following problem will arise in this case. That is, when drawing a preform consisting of a combination of such glass, the drawing temperature must be higher than 330° C. at which point the viscosity of the core glass is lower than $10^5$ poise, since the drawing temperature should be adjusted to the drawing temperature of the glass having a higher viscosity. This drawing temperature is suitable for the core glass because neither crystallization nor an increase in scattering take place at this temperature when the glass is drawn, but it is unsuitable for the clad glass because of an increase in scattering loss due to rapid crystallization of the glass which ultimately increases the scattering loss of the entire glass fiber. Further, while the viscosity of the core glass at the drawing temperature is $10^5$ poise, that of the clad glass is $10^3$. Therefore, it is difficult to have a smooth boundary between a core and a clad, and the residual stress due to thermal distortion after the formation of a fiber becomes so great that the strength of the fiber is reduced.

Figure 3:
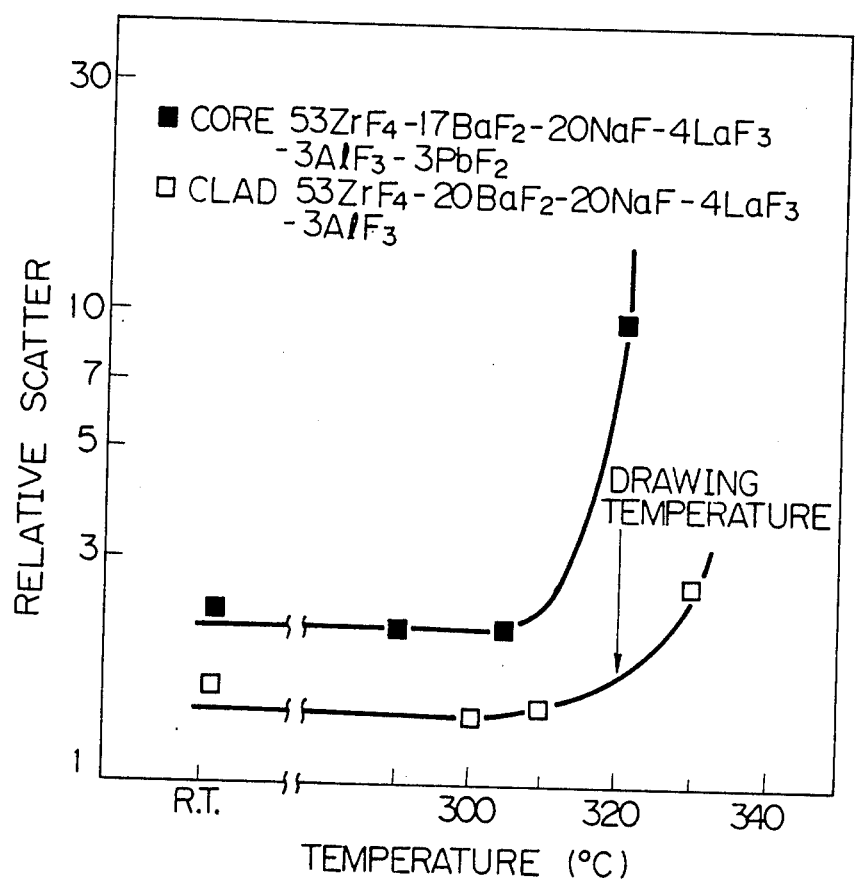
FIG. 3 is a graph showing the increase, respectively, in scattering in a core glass and a clad glass at a drawing temperature especially when the refractive indexes of both glasses are differentiated by adding $PbF_2$. In the graph, the relative scattering degrees of the glasses (where the scattering degree of quartz glass is 1) are shown along the Y-axis and heating temperature values are shown along the X-axis.

A similar problem will arise when the refractive index of the fiber is varied by use of $PbF_2$ which is often used as an additive. FIG. 3 is a graph showing results from measuring the heating temperature dependability of the scattering degrees of glass belonging to the $53ZrF_2$-$20BaF_2$-$20NaF$-$4LaF_3$-$3AlF_3$ type and the same type added with 3% $PbF_2$. As the specific refractive index difference between these materials is 0.55%, it is sufficient for them to form a core-clad structure insofar as the refractive index is concerned but this structure has no practicability since the core glass scatters increasingly at the temperature of 320° C. at which the glass is drawn.

The reason why the above problem arises is because when the compositions of the core and clad glass glasses are adjusted only in consideration of their refractive indexes, the viscosities of the glass will vary depending on the variations of the compositions. Therefore, to solve the problem, it is necessary to adjust the compositions of both glasses in consideration of their viscosities in addition to their refractive indexes. Further, to increase the strength of the drawn fiber, it is preferable to bring the linear expansion coefficients of the glass into coincidence with each other so that thermal distortion does not take place.

From the above point of view, it has been found as a result of examination of the compositions of the core and clad glass that by adding $H_fF_4$ and by the proper adjustment of the amounts of NaF and $H_fF_4$, it is possible to obtain a combination of the glasses which have substantially the same linear expansion coefficient and which are different only in refractive index. That is, it has been found that NaF contained in a glass not only reduces the refractive index of the material but also lowers the viscosity of the material thereby increasing the linear expansion coefficient, while adding $H_fF_4$ reduces the refractive index of the glass but increases the viscosity and decreases the linear expansion coefficient of the glass. Accordingly, by properly adjusting the amounts of NaF and $H_fF_4$, it is possible to produce various kinds of glass materials having substantially the same viscosity and linear expansion coefficient but different refractive indexes. Further, after examining the difference in NaF and $H_fF_4$ contents between the core and clad glasses and the rate of variation of the drawing temperature, it has been found that NaF helps reduce the drawing temperature by 3° C. per 1 mol while $H_fF_4$ increases the drawing temperature by 0.25° C. Accordingly, the change ΔT of the drawing temperature will be expressed by the following equation:

$$\Delta T = 0.25 \Delta H_f F_4 - 3 \Delta NaF \qquad (1)$$

where $\Delta NaF_4$ and $\Delta H_fF_4$ are differences in content in mol% between the core glass and the clad glass.

On the other hand, after examining the allowable error between the proper drawing temperature and the actual drawing temperature with respect to scattering degree, viscosity and linear expansion coefficient, it has been found that in the case of drawing a certain glass falling within the above-mentioned composition range, the allowable error range is in the order of ±5° C. Therefore, when this range is added to the equation (1), the following equation is obtained.

$$|0.25 \Delta H_f F_4 - 3 \Delta NaF| \leq 5 \qquad (2)$$

If it is desired to increase the difference in the specific refractive index difference between the core and clad glass, the amounts of NaF and $H_fF_4$ contained in the former may be reduced to be as small as possible and those contained in the latter may be increased as much as possible. On the other hand, if it is desired to reduce that difference, the reverse procedures may be taken.

FIG. 4 is a graph showing, as a preferred embodiment of the present invention, results from measuring the viscosities of a core glass material consisting of

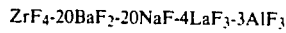

and a clad glass materials consisting of

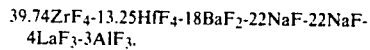

at various temperatures.

As the graph demonstrates, the viscosities of the glasses are the same and the specific refractive index difference shows a value of Δ=0.44% which is satisfactory for an optical fiber. Further, the linear expansion coefficients of both glasses are shown as $2.55 \times 10^{-5}$ deg$^{-1}$ for the core glass and $2.53 \times 10^{-5}$ deg$^{-1}$ for the clad glass both of which values are substantially equal so that the glasses could make an ideal combination.

FIG. 5 is a graph showing results of measuring the scattering degrees of the core and clad glass plotted against heating temperature variations. From this graph, it is understood that the crystallization of the glasses is not accelerated even when $H_fF_4$ is added but rather, the addition of it gives rise to an effect of suppressing the crystallization. Further, it is understood that both glasses show almost no increase in scattering even when it is heated to a temperature of 320° C. at which the viscosity thereof becomes $10^5$ poise and especially, the clad glass added with $HfF_4$ shows no change in its scattering degree up to a still higher temperature as compared with the core glass which is not added with $H_fF_4$.

As described above, it will be understood that the fluoride glass optical fiber according to the present invention consists of a core layer and a clad layer having different refractive indexes and made of glass of substantially the same viscosity and linear expansion coefficients and further, either of the glasses shows almost no increase in the scattering loss due to crystallization even at a drawing temperature at which the viscosity thereof becomes $\eta = 10^5$ poise.

In case of the fluoride glass optical fiber according to the present invention, the scattering loss of the fiber after drawing is as small as that of the preform so that the transmission loss of the fiber becomes extremely small. Further, due to the fact that the viscosities and the linear expansion coefficients of the core glass and the clad glass are substantially equal, the boundary between the core and the clad layer could easily be formed into a smooth surface and due to the absence of a residual stress resulting from thermal distortion, the mechanical strength of the fiber is increased.

From the foregoing it will now be apparent that a new and improved optical fiber has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A fluoride glass optical fiber for infrared light having a core layer and a clad layer each consisting mainly of $ZrF_4$-$BaF_2$-$LaF_3$-$AlF_3$, wherein NaF and $H_fF_4$ are used as additives to obtain a desired refractive index difference between the core layer and the clad layer and to obtain for each layer a viscosity and a linear expansion coefficient which are suitable for drawing said optical fiber, both NaF and $H_fF_4$ being present in at least one of the layers, and the total amount of NaF and $H_fF_4$ in the clad layer being larger than the total amount of NaF and $H_fF_4$ in the core layer.

2. A fluoride glass optical fiber according to claim 1, wherein the mixing ratio of said NaF and $H_fF_4$ satisfies the equation;

$$0.25 \Delta H_f F_4 - \Delta NaF < 5$$

where ΔNaF is the difference between the amount (mol%) of the NaF added to the core layer and that added to the clad layer, and $\Delta H_fF_4$ is the difference between the amount (mol%) of $H_fF_4$ added to the core layer and that added to the clad layer.

* * * * *